US012120586B2

(12) United States Patent
Libby et al.

(10) Patent No.: US 12,120,586 B2
(45) Date of Patent: Oct. 15, 2024

(54) SYSTEMS AND METHODS FOR DISTRIBUTED CHARGING IN DIGITAL TELECOMMUNICATIONS NETWORKS

(71) Applicant: Microsoft Technology Licensing, LLC, Redmond, WA (US)

(72) Inventors: Mark Libby, Groton, MA (US); Anupama Raghavan, Acton, MA (US); Krishna Gundamaraju, Westborough, MA (US); Girish Nair, Nashua, NH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/972,098

(22) Filed: Oct. 24, 2022

(65) Prior Publication Data
US 2023/0050017 A1    Feb. 16, 2023

Related U.S. Application Data

(63) Continuation of application No. 16/864,683, filed on May 1, 2020, now Pat. No. 11,483,685.
(Continued)

(51) Int. Cl.
*H04W 4/24* (2024.01)
*H04L 12/14* (2024.01)
*H04M 15/00* (2024.01)

(52) U.S. Cl.
CPC ........... *H04W 4/24* (2013.01); *H04L 12/1407* (2013.01); *H04M 15/31* (2013.01);
(Continued)

(58) Field of Classification Search
CPC ..... H04W 4/24; H04L 12/1407; H04M 15/31; H04M 2215/96; H04M 15/8214; H04M 221/32
See application file for complete search history.

(56) References Cited

U.S. PATENT DOCUMENTS

2013/0072186 A1* 3/2013 Picker ..................... H04W 8/12
455/432.1
2018/0020386 A1* 1/2018 Chandramouli .. H04W 36/0027
(Continued)

FOREIGN PATENT DOCUMENTS

WO    WO-2009056372 A1 *  5/2009  .......... H04J 11/0069

OTHER PUBLICATIONS

"Office Action Issued in European Patent Application No. 20729886.0", Mailed Date: Oct. 20, 2022, 6 Pages.
(Continued)

*Primary Examiner* — Muthuswamy G Manoharan
(74) *Attorney, Agent, or Firm* — Ray Quinney & Nebeker; James Bullough

(57) ABSTRACT

Techniques for distributed charging in digital telecommunications networks are disclosed. In one particular embodiment, the techniques may be realized as a method that includes provisioning a data path that carries a plurality of network flows, receiving a shared usage quota associated with the plurality of network flows, and allocating the shared usage quota among the plurality of network flows. For each network flow among the plurality of network flows, the method includes providing the data path with data indicative of an amount of the shared usage quota allocated to the network flow, configuring the data path to collect metering data associated with the network flow, and configuring the data path to enforce the shared usage quota based on the metering data associated with the network flow and the amount of the shared usage quota allocated to the network flow.

20 Claims, 4 Drawing Sheets

Related U.S. Application Data

(60) Provisional application No. 62/843,017, filed on May 3, 2019.

(52) U.S. Cl.
CPC .... *H04M 15/8214* (2013.01); *H04M 2215/32* (2013.01); *H04M 2215/782* (2013.01); *H04M 2215/96* (2013.01)

(56) References Cited

U.S. PATENT DOCUMENTS

2018/0317157 A1* 11/2018 Baek ............... H04W 48/18
2019/0053117 A1* 2/2019 Bae ................ H04W 36/125

OTHER PUBLICATIONS

"Decision to Grant Issued in European Patent Application No. 20729886.0", Mailed Date: Oct. 19, 2023, 2 Pages.
"Notice of Allowance Issued in European Patent Application No. 20729886.0", Mailed Date: Jun. 21, 2023, 8 Pages.

* cited by examiner

SYSTEMS AND METHODS FOR DISTRIBUTED CHARGING IN DIGITAL TELECOMMUNICATIONS NETWORKS

RELATED APPLICATIONS

This application is a Continuation of and claims priority to U.S. application Ser. No. 16/864,683, filed on May 1, 2020, which claims priority under 35 U.S.C. § 119(e) to U.S. Provisional Patent Application No. 62/843,017, entitled "Systems and Methods for Distributed Charging in Digital Telecommunications Networks," filed May 3, 2019. Each of the above-referenced applications are incorporated by reference in their entirety.

TECHNICAL FIELD

This application relates generally to digital networking and specifically to techniques for distributed charging in digital telecommunications networks.

BACKGROUND

To date, digital networking technologies have enabled a wide variety of digital applications, such as smart phones and wearable devices. As networking technologies improve, even more applications are on the horizon. For example, the deployment of $5^{th}$ generation (5G) digital cellular networks in the coming years is expected to enable a host of emerging applications such as autonomous vehicles, augmented and virtual reality devices, machine-to-machine (M2M) communications, and the like.

On the other hand, deploying, operating, and maintaining digital telecommunications networks can be costly. It can therefore be desirable to charge users for their usage of network services that are delivered via digital telecommunications networks.

Accordingly, it is desirable to develop improved techniques for charging users of digital telecommunications networks.

SUMMARY

Techniques for distributed charging in digital telecommunications networks are disclosed. In one particular embodiment, the techniques may be realized as a method that includes provisioning a data path that carries a plurality of network flows, receiving a shared usage quota associated with the plurality of network flows, and allocating the shared usage quota among the plurality of network flows. The data path includes a plurality of offloading points, each of the plurality of offloading points being configured to offload one or more of the plurality of network flows from the data path. For each network flow among the plurality of network flows, the method includes providing the data path with data indicative of an amount of the shared usage quota allocated to the network flow, configuring the data path to collect metering data associated with the network flow at a corresponding offloading point among the plurality of offloading points where the network flow is offloaded from the data path, and configuring the data path to enforce the shared usage quota based on the metering data associated with the network flow and the amount of the shared usage quota allocated to the network flow.

In another embodiment, the techniques may be realized as a system for distributed charging in digital telecommunications networks comprising at least one processor, wherein the at least one processor is further configured to perform the steps in the above-described method.

In another embodiment, the techniques may be realized as a method that includes provisioning, by a session management function (SMF) of a 5G Next Generation Mobile Core Network, a user plane that carries a plurality of network flows, the user plane comprising a plurality of user plane function (UPF) instances arranged in a series, each of the plurality of UPF instances being configured to offload one or more of the plurality of network flows to at least one of an edge network or a data network. The method further includes receiving, by the SMF, a shared usage quota associated with the plurality of network flows and allocating, by the SMF, the shared usage quota among the plurality of network flows. For each network flow among the plurality of network flows, the method further includes providing, by the SMF, a UPF instance among the plurality of UPF instances with data indicative of an amount of the shared usage quota allocated to the network flow, the UPF instance being configured to offload the network flow, configuring, by the SMF, the UPF instance to collect metering data associated with the network flow, and configuring, by the SMF, the UPF instance to enforce the shared usage quota based on the metering data associated with the network flow and the amount of the shared usage quota allocated to the network flow.

Figure 1:
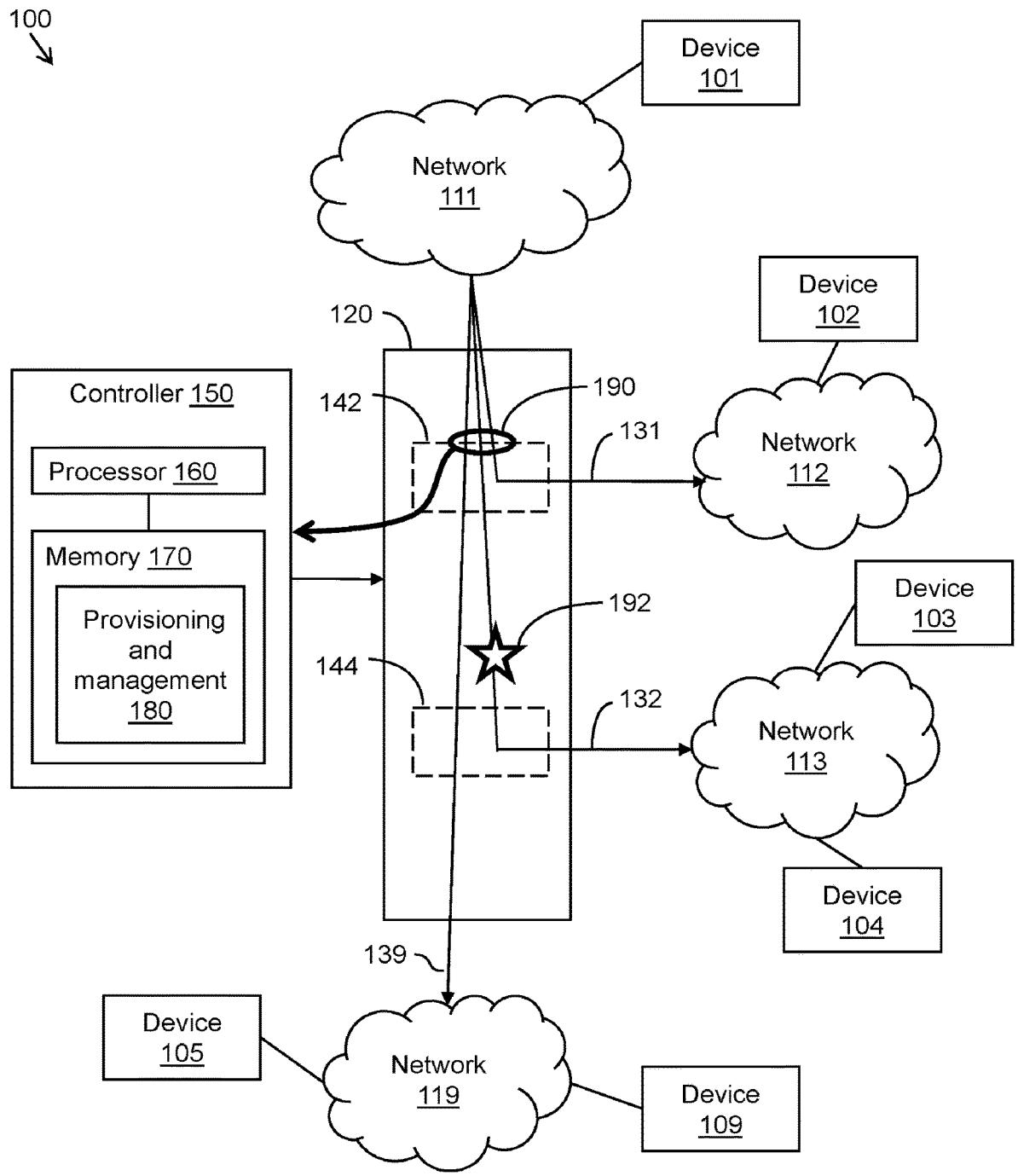
FIG. 1 is a simplified diagram of a system for online charging according to some embodiments.

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Digital telecommunications networks often include features for charging and quota enforcement. For example, configuring a network to charge users according to the amount of network bandwidth they use (e.g., the amount of uplink traffic sent, downlink traffic received, or a combination thereof) can facilitate efficient management and maintenance of the network.

Charging and quota enforcement can be implemented in a variety of ways. For example, users who access the network can be charged an amount of money for exceeding their quota, or their traffic can be blocked or throttled when they exceed their quota. These metering and enforcement mechanisms can help disincentivize users from overusing the network and straining the resources of the network. In addition, these mechanisms can ensure that high volume users pay more to access the network than low volume users. Charging can be "online" (e.g., users are charged in real-time based on their usage of the networking services, which can include real-time reduction in services if the user exceeds their usage limits) or "offline" (e.g., usage data is collected and stored, and the user is later charged at the end of a billing period, such that real-time usage is not affected).

On the other hand, the process of configuring a network to implement charging and quota management features can itself consume network resources. Moreover, it can be challenging to charge users accurately (e.g., without overcharging or undercharging). Accuracy can be particularly challenging under dynamic conditions, such as during a handoff that occurs when a user moves from one cell of a cellular network to another.

Accordingly, it is desirable to develop improved techniques for charging in digital telecommunication networks, particularly techniques that can be configured efficiently and charge users accurately.

FIG. 1 is a simplified diagram of a system 100 for online charging according to some embodiments. A plurality of devices 101-109 are communicatively coupled via a plurality of networks 111-119. Devices 101-109 generally correspond to computing devices with networking capabilities. Non-limiting examples of devices 101-109 include, but are not limited to, mobile devices, smart phones, wearable computers, laptop computers, desktop computers, or server blades. Devices 101-109 can also include or be associated with household devices, vehicles (including autonomous vehicles and drones), industrial equipment, medical devices, or the like. For example, devices 101-109 can include objects that are connected via networks 111-119 using a suitable framework such as Internet-of-Things (IOT).

Networks 111-119 can include various types of digital communication networks, such as local area networks, wide area networks, the Internet, wired networks, wireless networks, or any combination thereof. Networks 111-119 can be implemented using physical networking resources, virtual networking resources, or a combination thereof.

A data path 120 is coupled between networks 111-119 and is configured to carry network traffic flows 131-139 between a first network (network 111) and a plurality of second networks (networks 112-119). Network traffic flows 131-139 generally carry network traffic (e.g., sequences of packets or other digital signals that convey information) between device 101 and devices 102-109. For example, network traffic flows 131-139 can include uplink traffic (e.g., traffic that originates at device 101 and is transmitted to one or more of devices 102-109), downlink traffic (e.g., traffic that originates from one or more of devices 102-109 and is transmitted to device 101), or a combination thereof.

In some embodiments, one or more of network traffic flows 131-139 may carry traffic associated with one or more applications associated with device 101. Examples of applications that may be associated with network traffic flows 131-139 include, but are not limited to, streaming video applications, social media applications, messaging applications, augmented reality or virtual reality applications, machine to machine (M2M) applications, or the like. In some embodiments, one or more of network traffic flows 131-139 may be associated with a quality-of-service (QoS) or other parameters indicating the priority of a given flow relative to other flows.

Data path 120 includes a plurality of offloading points 142 and 144 where network traffic flows 131-139 are offloaded from data path 120. Although two offloading points 142 and 144 are depicted in FIG. 1, it is to be understood that greater or fewer offloading points may be included depending on, for example, the number of network traffic flows 131-139, the number of networks 111-119, or other factors that influence the configuration of system 100.

In some embodiments, offloading points 142 and 144 may be arranged in a series (e.g., chained). Consistent with such embodiments, at each offloading point, a determination is made with respect to network traffic received at the offloading point whether the network traffic belongs to a flow that is to be offloaded at that point or whether the network traffic belongs to a flow that is to be passed on to a subsequent offloading point in the series. A final offloading point in the series (e.g., offloading point 144) may be configured to pass network traffic that is not offloaded at the final offloading point to a default network (e.g., network 119), such as the Internet.

A controller 150 of system 100 includes a processor 160 (e.g., one or more hardware processors) coupled to a memory 170 (e.g., one or more non-transitory memories). In some embodiments, memory 170 may store one or more computer programs that include, e.g., instructions and data to cause processor 160 to perform operations associated with the one or more computer programs. Although a single processor 160 and memory 170 are shown in FIG. 1, the computing resources of controller 150 can generally be distributed, virtualized, containerized, cloud-based, or the like. In some embodiments, controller 150 may be located in one or more data centers of a telecommunications service provider.

As depicted in FIG. 1, memory 170 stores a provisioning and management program 180 that is configured to provision and manage data path 120 when executed by processor 160. In general, provisioning and management program 180 is responsible for configuring data path 120, e.g., by configuring the arrangement and locations of offloading points 142 and 144, configuring where network traffic flows 131-139 are offloaded from data path 120, configuring which network traffic belongs to which network traffic flows 131-139, and the like.

Provisioning and management program 180 can also be configured to provide online charging services, e.g., services for monitoring and/or enforcing quotas on the amount of network traffic associated with data path 120. For example, device 101 (or a user of device 101) may be assigned a quota on uplink, downlink, or total network traffic. Different types of network traffic may be charged against the quota in different ways, e.g., in a weighted fashion. For example, certain types of traffic flows may be zero-rated (e.g., they do not consume any of the quota), and others may be charged less or more than other flows relative to the quantity of bandwidth that they consume. As a non-limiting illustration, a network traffic flow carrying video streaming traffic associated with a video streaming content provider (e.g., Netflix or Youtube) may be charged at a first rate, a network traffic flow carrying social media traffic associated with a social media content provider (e.g., Facebook or Instagram) may be charged at a second rate, and a default network traffic flow carrying general Internet traffic may be charged at a third rate, the three rates being different from one another. Accordingly, provisioning and management program 180 may configure data path 120 to monitor network traffic flows 131-139 and enforce the quotas based on the amount of network traffic in each of network traffic flows 131-139.

As depicted in FIG. 1, data path 120 is configured to meter network traffic flows 131-139 at a metering point 190 located at or between the first offloading point 142 and network 111 (e.g., at an ingress point of data path 120). At metering point 190, metering data associated with each of network traffic flows 131-139 is collected. In some embodiments, the collected metering data may be sent to controller 160 and/or may be used and analyzed within data path 120.

The collected metering data can be used to enforce a usage quota associated with network flows 131-139, e.g., by throttling or limiting an amount of network traffic when a usage quota is used up, by charging a user of device 101 for an additional amount of usage quota, or the like.

Because each of network traffic flows 131-139 passes through metering point 190, the arrangement of metering point 190 relative to offloading points 142 and 144 allows metering and quota enforcement features to be implemented at a single location in data path 120. Consequently, this arrangement may be selected for simplicity and/or for localized usage of computing resources. On the other hand, this arrangement may result in situations in which the user of device 101 is overcharged, e.g., charged for traffic that does not reach its intended destination. For example, a fault 192 may exist within data path 120 that prevents at least a portion of network traffic flow 132 from flowing between offloading point 142 and offloading point 144. The presence of fault 192 may result in data packets in network traffic flow 132 being dropped, delayed, or otherwise prevented from reaching their destination in a timely, accurate manner. However, because metering of network traffic flow 132 occurs at a location in data path 120 positioned before fault 192, network traffic that is impacted by fault 192 may be charged to the user despite failing to reach its destination, resulting in overcharging.

Moreover, in some embodiments, device 101 may correspond to a mobile device. When the mobile device undergoes a mobility event (e.g., by changing from one cell of a cellular network to another, thereby changing the location of the ingress point where it connects to data path 120), the mobility event may cause the location of offloading point 142 to move. Because offloading point 142 generally corresponds to the closest offloading point to device 101 in a series of chained offloading points, offloading point 142 may be the most likely offloading point in the series to move in response to the mobility event. When offloading point 142 and its associated computing resources move, various data is transferred between data path 120 and controller 150 to re-establish metering point 190 at the new location of offloading point 142. However, the process of re-establishing metering point 190 may consume significant network bandwidth and may take a considerable amount of time, particularly considering that metering of each of network traffic flows 131-139 occurs at metering point 190. In addition, during this handover process, there is a risk of double counting traffic (resulting in overcharging), failing to count traffic (resulting in undercharging), or otherwise charging traffic in an inconsistent or inaccurate manner. Accordingly, the localized charging configuration of system 100 may present various challenges that can reduce the efficiency or accuracy of charging users of system 100.

Figure 2:
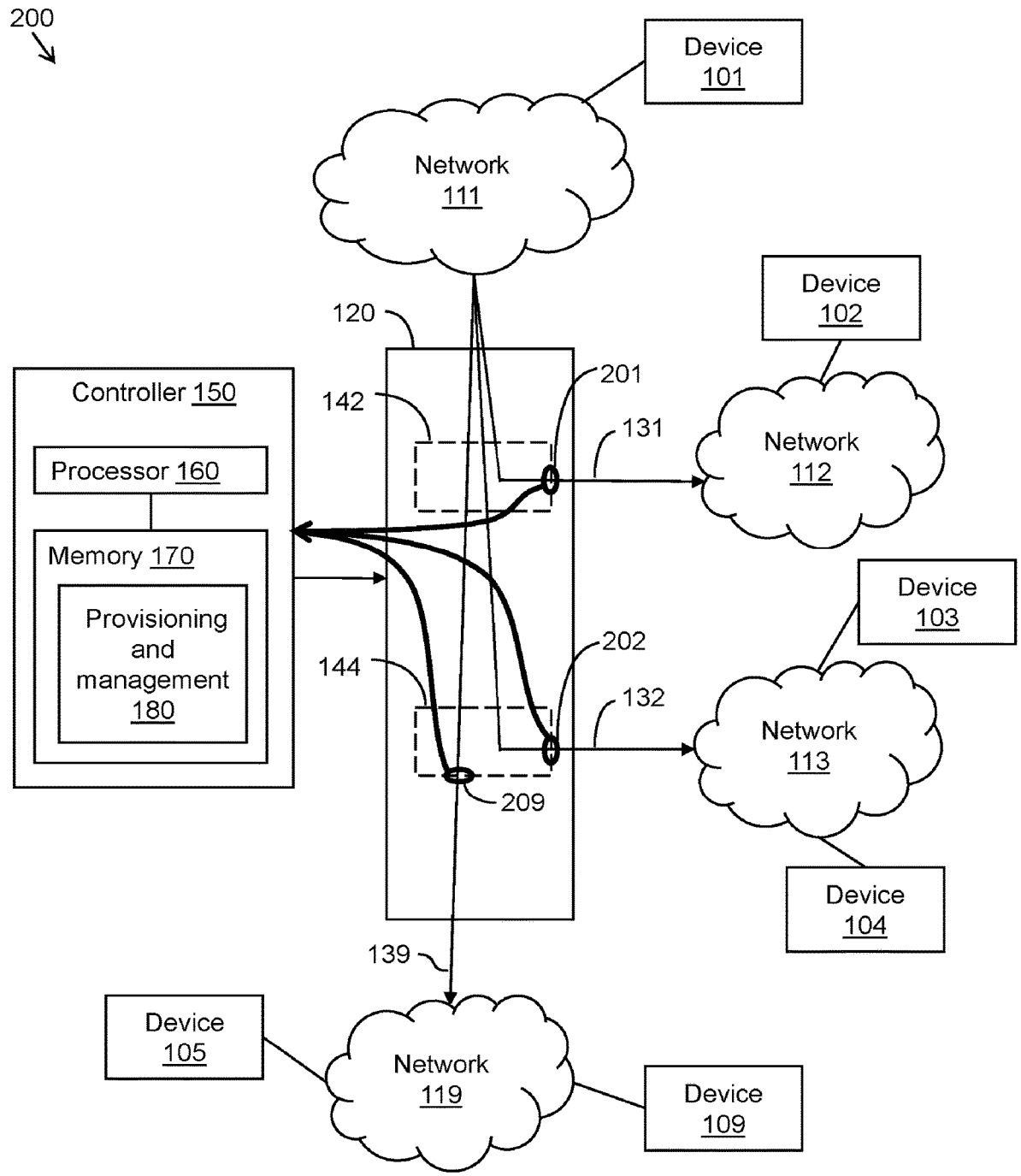
FIG. 2 is a simplified diagram of a system for distributed online charging according to some embodiments.

FIG. 2 is a simplified diagram of a system 200 for distributed online charging according to some embodiments. In some embodiments consistent with FIG. 1, the distributed charging configuration of system 200 may address one or more of the above-identified challenges associated with the localized charging configuration of system 100.

In general, the components of system 200 correspond to those of system 100 discussed above. However, whereas system 100 includes a metering point 190 located at or between offloading point 142 and network 111, system 200 includes a plurality of distributed metering points 201-209 located at or between offloading points 142 or 144 and networks 112-119 (e.g., at egress points of data path 120, rather than the ingress point). In this arrangement, distributed metering points 201-209 are configured to meter network traffic flows 131-139 at physically dispersed locations where the network flows are offloaded from data path 120, rather than the single, collective point where they enter data path 120 from network 111.

Because traffic is metered at points where network traffic flows 131-139 are offloaded from data path 120, the risk of charging the user of device 101 for traffic that does not reach its destination (e.g., due to the presence of fault 192 within data path 120) is reduced. For example, referring to FIG. 1, the portion of network traffic that fails to reach its destination due to the presence of fault 192 is improperly charged to the user in system 100 because the traffic is charged at metering point 190. However, the traffic would not be charged to the user in system 200 because that traffic would not reach distributed metering point 202. Accordingly, the risk of overcharging the user is reduced in system 200.

Moreover, the arrangement of distributed metering points 201-209 can facilitate the handling of mobility events, e.g., events that occur when device 101 moves to a different physical location or otherwise changes the ingress point where it connects to data path 120. For example, in response to the mobility event, the location of offloading point 142 (e.g., the offloading point that is physically closest to device 101) may change, but one or more subsequent offloading points in the series that are more distant from device 101 (e.g., offloading point 144) may remain in the same location. Consequently, in response to the mobility event, the distributed metering points associated with offloading point 142 (e.g., metering point 201) may be re-established at the new location, but other distributed metering points at offloading points further down the chain (e.g., metering points 202-209) may not be relocated. The reduction in bandwidth usage and/or delay that would otherwise be associated with relocating metering points 202-209 may result in more efficient use of networking and computing resources in system 200 relative to system 100. Moreover, the risk of inaccurately charging (e.g., overcharging or undercharging) the user during a handoff period may be reduced when metering points 202-209 are not relocated.

Figure 3:
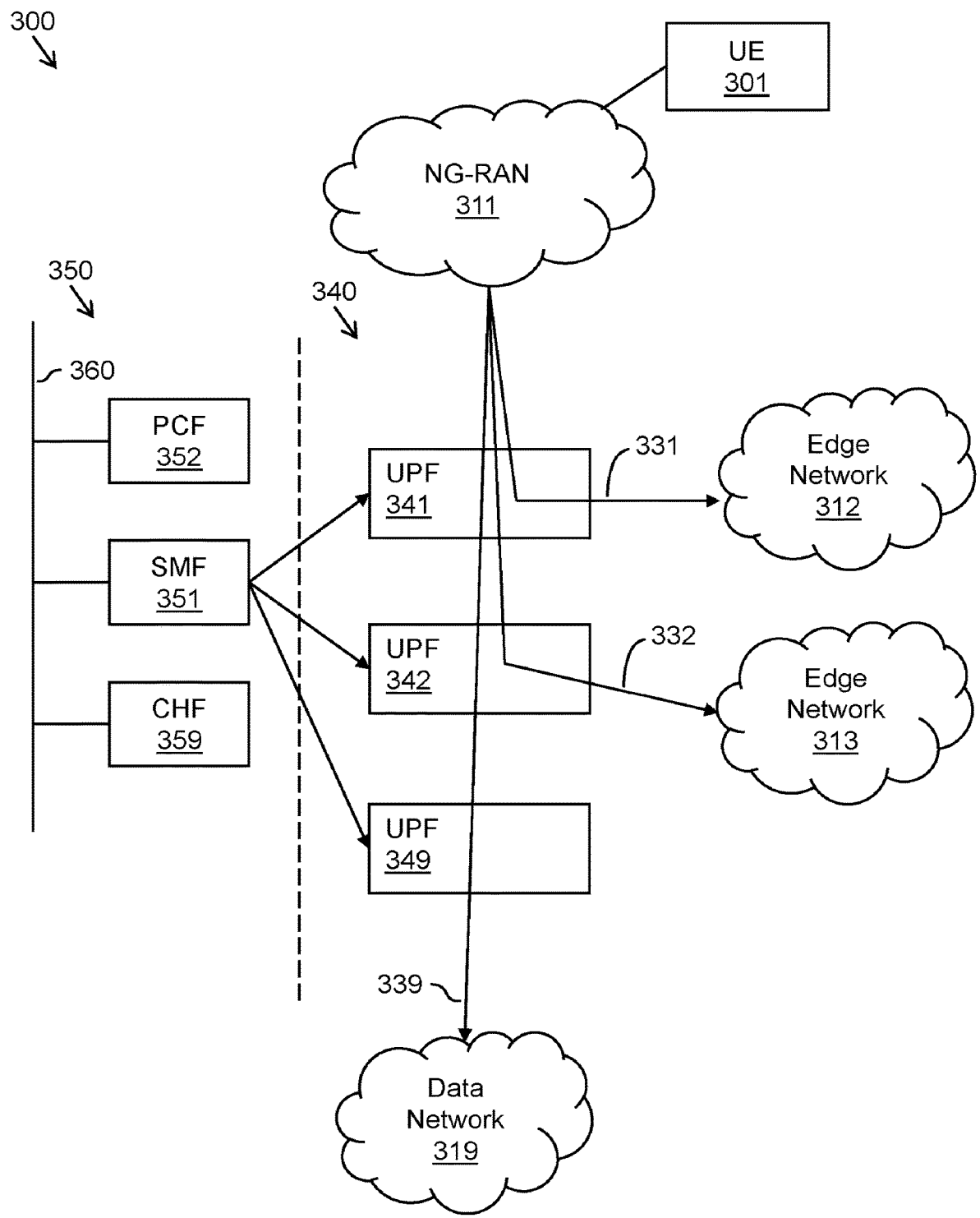
FIG. 3 is a simplified diagram of a 5G Next Generation Mobile Core Network (5GC) with distributed online charging according to some embodiments.

FIG. 3 is a simplified diagram of a 5G Next Generation Mobile Core Network (5GC) 300 with distributed online charging according to some embodiments. In some embodiments consistent with FIGS. 1-2, 5GC 300 may correspond to an implementation of system 200 in the context of a $5^{th}$ generation (5G) digital cellular network. 5G is a telecommunications standard being developed by the $3^{rd}$ Generation Project Partnership (3GPP). A general description of the system architecture for a 3GPP 5G system, such as 5GC 300, is provided in 3GPP Specification TS 23.501, entitled "System Architecture for the 5G System; Stage 2," 3GPP Specification TS 23.502, entitled "Procedures for the 5G System; Stage 2," and 3GPP Specification TS 23.503, entitled "Policy and Charging Control Framework for the 5G System; Stage 2," which are incorporated by reference herein in their entirety.

5GC 300 includes user equipment (UE) 301, which may generally correspond to device 101. UE 301 can include virtually any device used by an end-user of 5GC 300 to communicate via 5GC 300, such as a smart phone, a tablet, or a laptop computer. UE 301 can also be associated with a machine, such as a vehicle (e.g., a self-driving vehicle) or a medical device. In some embodiments, UE 301 may include a radio interface to communicate wirelessly with 5GC 300.

UE 301 communicates via an access network (e.g., a Next Generation Radio Access Network, or NG-RAN) 311, which may generally correspond to network 111. When UE 301 is connected to NG-RAN 301, uplink and downlink traffic associated with UE 301 can be delivered via 5GC 300 to or from one or more data networks, such as edge network 312, edge network 313, or data network 319. In general, edge networks 312 and 313 provide access to network nodes located physically proximate to UE 301, whereas data network 319 provides access to remote network nodes. For example, data network 319 may be used to communicate with an origin server associated with an application, and edge network 312 or 313 may be used to communicate with a content delivery network (CDN) associated with the application. To illustrate, in the case of a video streaming application, data network 319 may be used to access and browse a video catalogue from an origin server for the application (e.g., from a server located in a cloud-based data center), and edge network 312 or 313 may be used to stream and view a selected video from a CDN for the application (e.g., from a server located on the premises of the Internet service provider or a server connected to a nearby Internet exchange point).

A plurality of network traffic flows 331-339, which generally correspond to network traffic flows 131-139, carry network traffic associated with UE 301 between NG-RAN 311 and edge and/or data networks 312-319. Like network traffic flows 131-139, network traffic flows 331-339 can include uplink traffic (e.g., traffic that originates at UE 301 and is transmitted to one or more of edge and/or data networks 312-319), downlink traffic (e.g., traffic that originates from one or more of edge and/or data networks 312-319 and is transmitted to UE 301), or a combination thereof. In some embodiments, one or more of network traffic flows 331-339 may carry traffic associated with one or more applications associated with UE 301. Examples of applications that may be associated with network traffic flows 131-139 include, but are not limited to, streaming video applications, social media applications, messaging applications, augmented reality or virtual reality applications, machine to machine (M2M) applications, or the like. In some embodiments, one or more of network traffic flows 331-339 may be associated with a quality-of-service (QoS) or other parameters indicating the priority of a given flow relative to other flows.

Between NG-RAN 311 and edge or data networks 312-319, 5GC 300 carries network traffic using data planes, which can include a user plane 340 and a control plane 350. In some embodiments, 5GC 300 implements the data planes using the Control and User Plane Separation (CUPS) framework, which supports the creation of multiple user plane instances without a corresponding increase in the number of control plane instances. For example, the CUPS framework can allow multiple user plane instances to be created that are specialized for different applications without incurring the corresponding expense of additional specialized control planes.

Consistent with the CUPS framework, user plane 340 carries network traffic flows 331-339 through a series of user plane function (UPF) instances 341-349, which in FIG. 3 are depicted as being arranged in a chained manner. In some embodiments, the series of UPF instances 341-349 may collectively correspond to data path 120. The sequence of UPF instances 341-349, as illustrated in FIG. 3, may reflect logical and/or physical proximity to UE 301. For example, UPF instance 341 is the first logical UPF instance in the series of UPF instances 341-349, and the computing resources that implement UPF instance 341 may also be physically closer to UE 301 than the computing resources that implement UPF instances 342-349.

One or more of the UPF instances 341-349 corresponds to an offloading point of user plane 340, e.g., a point where one or more of network flows 331-339 is offloaded from the data path to edge and/or data networks 312-319 (e.g., in the case of uplink traffic) or received by the data path from edge and/or data networks 312-319 (e.g., in the case of downlink traffic). In this manner, the series of UPF instances 341-349 can steer network traffic to achieve certain goals. For example, high priority network traffic can be offloaded at a point that is logically or physically close to UE 301 to achieve low latency and/or high reliability. Network traffic that is not offloaded at a given UPF instance is passed along to a subsequent UPF instance in the chain. In some embodiments, network tunneling connections may be established between adjacent UPF instances to efficiently transport network traffic along the length of the chain.

Control plane 350 implements one or more control plane functions 351-359 associated with provisioning and managing user plane 340. Examples of control plane functions 351-359 include, but are not limited to, a session management function (SMF) 351, a policy control function (PCF) 352, and a charging function (CHF) 359. In some embodiments, control plane functions 351-359 may be modular and can communicate with one another via a service based interface (SBI) 360 or another suitable communication framework. In some embodiments, SBI 360 may allow control plane functions 351-359 to interact via application programming interfaces (APIs) using a suitable communication protocol (e.g., HTTP) and message format (e.g., JSON).

In some embodiments consistent with FIG. 1, control plane functions 351-359 generally correspond to provisioning and management program 180. Accordingly, control plane functions 351-359 may be operative to configure and manage UPF instances 341-349. For example, during provisioning, PCF 352 may activate one or more traffic steering rules based on criteria such as the identity of UE 301, the subscriber location, the network slice, the data network name (DNN), and the like. As a non-limiting example, a traffic steering rule may include offloading a portion of the network traffic associated with UE 301 (e.g., one or more of network traffic flows 331-339) at the closest offloading point in the data path to UE 301 (e.g., at the first UPF instance 341). PCF 352 then sends the activated traffic steering rule to SMF 351 via SBI 360 through a policy exchange process. Next, based on the traffic steering rule, SMF 351 provisions the corresponding UPF instances with one or more rules (e.g., packet detection rules (PDRs), forwarding action rules (FARs), Quality of Service Enforcement Rules (QERs), usage reporting rules (URRs), buffering action rules (BARs), or the like) suitable for implementing the traffic steering rule.

In some embodiments, during provisioning, CHF 359 may send one or more usage limits to SMF 351. For example, a usage limit may include an online usage quota associated with UE 301 and/or its corresponding network traffic flows 331-339. Exemplary embodiments of CHF 359, along with a description of processes for communicating usage limits between CHF 359 and SMF 351 via SBI 360, are described generally in 3GPP Specification TS 32.290, entitled "Telecommunication management; Charging management; 5G system; Services, operations and procedures of charging using Service Based Interface (SBI)," which is incorporated by reference herein in its entirety.

The usage quota provided by CHF 359 is to be shared among network traffic flows 331-339. Accordingly, SMF 351 may be configured to allocate the shared usage quota among network traffic flows 331-339. The shared usage quota may be allocated in equal portions or in a manner that accounts for the possibility that different types of network traffic can be charged against the quota in different ways, e.g., in a weighted fashion. For example, as discussed previously, certain types of traffic flows may be zero-rated (e.g., they do not consume any of the quota), and others may be charged less or more than other flows relative to the quantity of bandwidth that they consume. As a non-limiting illustration, a network traffic flow carrying video streaming traffic associated with a video streaming content provider (e.g., Netflix or Youtube) may be charged at a first rate, a network traffic flow carrying social media traffic associated with a social media content provider (e.g., Facebook or Instagram) may be charged at a second rate, and a default network traffic flow carrying general Internet traffic may be charged at a third rate, the three rates being different from one another. Additional examples of techniques for allocating the shared usage quota are discussed below with reference to FIG. 4.

In some embodiments, after the usage quota is allocated, SMF 351 may configure user plane 340 to meter network traffic flows 331-339 and to enforce the usage quotas in accordance with to the allocation. As discussed previously with reference to FIGS. 1-2, there are a variety of possible arrangements that SME 351 can select with respect to where in the data path the metering and enforcement occurs. For example, in one arrangement, SME 351 may configure the first user plane instance in the series (UPF instance 341) to meter each of network flows 331-339. This localized arrangement is analogous to the arrangement depicted in FIG. 1, where network flows 131-139 are metered at a single metering point 190. However, as discussed with reference to FIG. 1, there are various problems associated with this arrangement. For example, a user of UE 301 may be overcharged for traffic that does not reach its destination (e.g., by charging for packets that are dropped in transit between UPF instance 341 and UPF instance 342 or between UPF instance 342 and UPF instance 349). Moreover, when UE 301 moves to a different location (e.g., during a handoff from NG-RAN 311 to another access network), UPF instance 341 may be the most likely of UPF instances 341-349 to move locations because it is physically and/or logically closest to UE 301. When UPF instance 341 meters each of network lows 331-339, there may be significant overhead (e.g., time and bandwidth usage) associated with moving UPF instance 341. Furthermore, during the transition period as UPF instance 341 moves to its new location, metering may be inaccurate due to double counting and/or missing packets.

To address these challenges, SMF 351 may configure user plane 340 to meter network traffic flows 331-339 in a distributed manner, e.g., by metering each of network flows 331-339 at the point in the data path where offloading to edge and/or data networks 312-319 occurs. This arrangement generally corresponds to the arrangement depicted in FIG. 2. For example, UPF instance 341 may be configured to meter network traffic flow 331, as network traffic flow 331 is offloaded to edge network 312 by UPF instance 341. Meanwhile, UPF instance 341 may be configured to send remaining network traffic flows 342-349 to the next user plane instance in the series (e.g., UPF instance 342) without metering. Similarly, UPF instance 342 may be configured to meter network traffic flow 332, and UPF instance 349 may be configured to meter network traffic flow 339.

In some embodiments, SMF 351 may configure user plane 340 to meter and/or enforce quota limits using a suitable messaging construct (e.g., using a shared messaging format and procedure that the sender and recipient both understand). For example, the messaging constructs may be compatible with the Packet Forwarding Control Protocol (PFCP), which is used at the interface between the user plane and control plane in 5G networks (e.g., at the N4 interface). The PCFP protocol is described in further detail in 3GPP Specification TS 29.244, entitled "Interface between the Control Plane and the User Plane nodes," which is incorporated by reference herein in its entirety.

The foregoing description of 5GC 300 is non-limiting, and various of its components may be added, removed, modified, substituted, or rearranged without departing from the broader spirit and scope of the disclosure. In some embodiments, one or more of control plane functions 351-359 may be rearranged or combined. For example, PCF 352 and CHF 359 may be combined to form a policy control and charging function (PCH). In some embodiments, the forgoing description of 5GC 300 may be applied in the context of digital communication standards other than 5G, such as the 4G/LTE standard, future generations of 3GPP standards that follow the 5G standard, non-3GPP standards, or the like. For example, the forgoing description may be applicable to a 4G/LTE system that is modified to allow user plane instances (e.g., PGW-U instances) to be chained in a manner analogous to UPF instances 331-339. In some embodiments, NG-RAN 511 may be substituted or combined with other types of access networks, such as a wired access network, a 4G access network (e.g., E-UTRAN), or the like.

Moreover, although FIGS. 2 and 3 depict fully distributed online charging, where each of the network flows associated with the user device (e.g., network traffic flows 131-139 or network traffic flows 331-339) are metered in a distributed manner, alternative arrangements are possible. For example, in a hybrid arrangement, some of the network traffic flows may be metered in a distributed manner (e.g., at the point where the flows are offloaded from the data path) and others may be metered at the point where the flows enter the data path. In some embodiments, one or more network flows associated with the user device may not be metered at any point in the data path. In some embodiments, one or more of the network flows may be metered at multiple points in the data path (e.g., at both the point where the flow enters the data path and at the point where it is offloaded from the data path).

Figure 4:
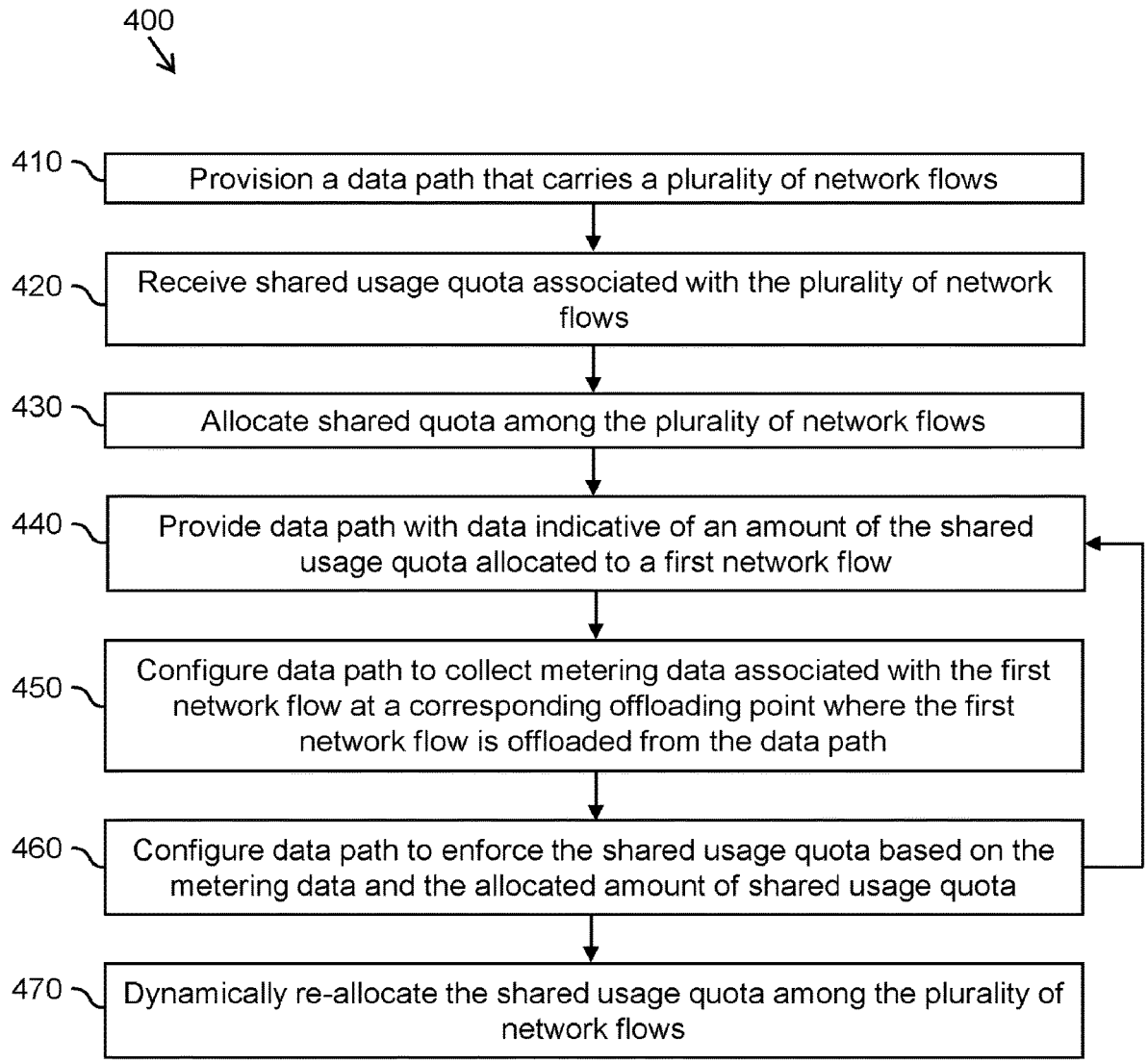
FIG. 4 is a simplified diagram of a method for configuring a data path for distributed online charging according to some embodiments.

FIG. 4 is a simplified diagram of a method 400 for configuring a data path for distributed online charging according to some embodiments. In some embodiments consistent with FIGS. 1-3, method 400 may be performed by controller 150 and/or SMF 351 during the provisioning and management of data path 120 or user plane 340, respectively.

At a process 410, a data path that carries a plurality of network flows is provisioned. For example, the data path may generally correspond to data path 120 or the series of UPF instances 341-349 of user plane 340, and the network flows may correspond to network traffic flows 131-139 and/or network traffic flows 331-339. The data path includes a plurality of offloading points, such as offloading points 142 and 144 or UPF instances 341-349, each of which is configured to offload one or more of the plurality of network flows from the data path. In some embodiments, the offloading points may be arranged as in a series, e.g., in a chained manner, such that some offloading points may be logically or physically more distant from an ingress point where the plurality of network flows enter the data path.

At a process 420, a shared usage quota associated with the plurality of network flows is received. For example, the shared usage quota may indicate an online quota associated with a user of a user device associated with the network flows, such as device 101 or UE 301. In some embodiments, the shared usage quota may be received from a control plane function, such as PCF 352 or CHF 359, via a service based interface, such as SBI 360.

At a process 430, the shared usage quota is allocated among the plurality of network flows. In some embodiments, the shared usage quota may be allocated equally or in a weighted manner to account for the possibility that different types of network traffic can be charged against the quota in different ways. For example, as discussed previously, certain types of network flows may be zero-rated (e.g., they do not consume any of the quota), and others may be charged less or more than other flows relative to the quantity of bandwidth that they consume. As a non-limiting illustration, a network traffic flow carrying video streaming traffic associated with a video streaming content provider (e.g., Netflix or Youtube) may be charged at a first rate, a network traffic flow carrying social media traffic associated with a social media content provider (e.g., Facebook or Instagram) may be charged at a second rate, and a default network traffic flow carrying general Internet traffic may be charged at a third rate, the three rates being different from one another.

As the above discussion suggests, a wide variety of factors may be considered when allocating the shared usage quota. Examples of factors on which the allocation may be based can include, but are not limited to the applications corresponding to the network flows (e.g., traffic associated with Application A is allocated 20% of the quota, traffic associated with Application B is allocated 15% of the quota, etc.), the locations associated with the offloading points (e.g., traffic offloaded at Data Center A is allocated 50% of the quota, traffic offloaded at Data Center B is allocated 35% of the quota, etc.), or the like, or any combination thereof.

In addition, the shared quota can be allocated dynamically based on usage, e.g., the quota may be allocated on-demand. For example, rather than allocating a fixed portion of the quota to each network traffic flow at the beginning of a session, the shared quota can be dynamically allocated during the course of a session. Consistent with such embodiments, the dynamic allocation may be determined in response to usage or metering data associated with each network traffic flow received during the course of the session. As network traffic flows consume more bandwidth, they are allocated more of the shared quota. For example, when the usage of a given flow is determined to exceed a threshold value, an additional portion of the shared usage quota (e.g., a fixed amount or a percentage of the remaining quota) may be allocated to that flow.

At a process 440, the data path is provided with data indicative of an amount of the shared usage quota allocated to a first network flow. For example, in the context of a 5G system, such as 5GC 300, the data may be provided via the N4 interface between the user plane and the control plane in accordance with the Packet Forwarding Control Protocol (PFCP).

At a process 450, the data path is configured to collect metering data associated with the network flow at a corresponding offloading point among the plurality of offloading points where the first network flow is offloaded from the data path. For example, the first network flow may be metered at a point between where it is offloaded from the data path and its destination. In embodiments consistent with FIG. 3, the metering point may correspond to a UPF instance, such as UPF instances 341-349. In some embodiments, the destination may correspond to an edge network, a data network, the Internet, or the like. In general, this point can correspond to a location that is logically or physically more distant from the ingress point where the network flows enter the data path than a first offloading point among the plurality of offloading points. Consequently, even when the location of the first offloading point moves in response to a change in the ingress point (e.g., a change that may be due to a mobility event caused by movement of the user device associated with the network flows), the location of the point where the metering data is collected may remain in the same. This may reduce the likelihood that such mobility events cause disruptions or inaccuracies during the collection of metering data.

At a process 460, the data path is configured to enforce the shared usage quota based on the metering data associated with the first network flow and the amount of the shared usage quota allocated to the first network flow. In some embodiments, enforcement of the usage quota may include blocking, throttling, or limiting an amount of network traffic when a usage quota is used up, charging a user for an additional amount of usage quota, or the like. In some embodiments, consistent with providing an online charging service, enforcement of the usage quota may occur in real-time.

In some embodiments, processes 440-460 may be repeated for each network flow among the plurality of network flows, such that charging occurs in a distributed manner, e.g., at the points where each of the network flows are offloaded from the data path.

At a process 470, the shared usage quota may be dynamically re-allocated among the plurality of network flows. In some embodiments, the shared usage quota may be re-allocated in response to determining, based on the metering data, that a network flow among the plurality of network flows has less remaining quota than other network flows among the plurality of network flows. For example, in a case where a large amount of traffic is being offloaded at a first offloading point, and less traffic is being offloaded at other offloading points, a portion of the shared quota allocated to the other offloading points may be re-allocated to the first offloading point. Such re-allocation may reduce the frequency of instances where the shared usage quota is exceeded. A wide variety of techniques may be used to determine when and how to perform the re-allocation. For example, re-allocation may be triggered when a remaining portion of the quota allocated to the first network flow dips below a first predetermined threshold. Once the re-allocation is triggered, it may be determined whether one or more other network flows have a remaining quota that exceeds a second predetermined threshold. When a network flow with a remaining quota that exceeds the second predetermined threshold is identified, at least a portion of that remaining quota may be transferred to the first network flow.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

We claim:

1. A computer-implemented method, comprising:
provisioning a data path that carries network traffic via a plurality of network flows to a plurality of networks, the data path including a plurality of offloading points having a first offloading point from which network traffic can be offloaded to a first network and a second offloading point from which network traffic can be offloaded to a second network, the second offloading point being chained in series behind the first offloading point such that the first offloading point is configured to make a determination to offload network traffic of a first network flow to the first network or pass the network traffic to the second offloading point and the second offloading point is configured to make a determination to offload network traffic of a second network flow to the second network;
receiving a shared usage quota associated with the plurality of network flows including the first network flow and the second network flow;
configuring the first offloading point to apply a first metered amount of the shared usage quota to the first network flow that is offloaded to the first network at the first offloading point; and
configuring the second offloading point to apply a second metered amount of the shared usage quota to the second network flow that is offloaded to the second network at the second offloading point.

2. The method of claim 1, the data path being provisioned on a user plane in which the first offloading point includes a first user plane function (UPF) instance and the second offloading point includes a second UPF instance.

3. The method of claim 1, wherein one of the first network and the second network is an edge network.

4. The method of claim 3, wherein one of the first network and the second network is a data network.

5. The method of claim 1, wherein the first offloading point and the second offloading point are chained together via a network tunnelling connection established between adjacent offloading points of the plurality of offloading points.

6. The method of claim 1,
wherein configuring the first offloading point to apply the first metered amount includes configuring the first offloading point to charge network traffic against the shared usage quota using a first rate, and
wherein configuring the second offloading point to apply the second metered amount includes configuring the second offloading point to charge network traffic against the shared usage quota using a second rate.

7. The method of claim 6, wherein at least one offloading point of the plurality of offloading points is configured to charge network traffic at a zero rate in which the shared usage quota is not consumed when network traffic is offloaded at the at least one offloading point.

8. The method of claim 1, wherein the shared quota is distributed between the first offloading point and the second offloading point based on predetermined quantities of network traffic to be permitted to be offloaded to each of the first network and the second network.

9. The method of claim 1, wherein the data path includes a last offloading point chained in series after the first offloading point and the second offloading point, the last offloading point being configured to offload network traffic to a default network after the network traffic has passed through the data path at each of the first offloading point and the second offloading point.

10. The method of claim 9, wherein the default network is the Internet, and wherein the method further comprises configuring the last offloading point to apply a last metered amount of the shared usage quota.

11. The method of claim 1, further comprising enforcing the shared usage quota by throttling network traffic of at least one of the first network flow or the second network flow when the shared usage quota is used up.

12. The method of claim 1, wherein when the first offloading point passes the network traffic to the second offloading point, the first offloading point does not meter the shared usage quota.

13. The method of claim 1, wherein the second offloading point is chained in series behind the first offloading point such that the second offloading point is logically or physically more distant than the first offloading point from an ingress point where the plurality of network flows enters the data path.

14. The method of claim 1, wherein the plurality of offloading points are ordered within a series of chained offloading points in accordance with the plurality of network flows being associated with respective offloading points of the plurality of offloading points.

15. In a core network of a mobile communication environment, a method implemented by one or more network functions within the core network, the method comprising:
provisioning a data path that carries network traffic via a plurality of network flows to a plurality of networks, the data path including a plurality of user plane function (UPF) instances, the plurality of UPF instances including a first UPF instance from which network traffic can be offloaded to a first network and a second UPF instance from which network traffic can be offloaded to a second network, the second UPF instance being chained in series behind the first UPF instance such that the first UPF instance is configured to make a determination to offload network traffic of a first network flow to the first network or pass the network traffic to the second UPF instance and the second UPF instance is configured to make a determination to offload network traffic of a second network flow to the second network;
receiving a shared usage quota associated with a plurality of network flows including the first network flow and the second network flow;
configuring the first UPF instance to apply a first metered amount of the shared usage quota to the first network flow that is offloaded to the first network at the first UPF instance; and
configuring the second UPF instance to apply a second metered amount of the shared usage quota to the second network flow that is offloaded to the second network at the second UPF instance.

16. The method of claim 15, wherein one of the first network and the second network is an edge network, and wherein one of the first network and the second network is a data network.

17. The method of claim 15, wherein the first UPF instance and the second UPF instance are chained together via a network tunnelling connection established between adjacent UPF instances of the plurality of UPF instance.

18. The method of claim 15,
wherein configuring the first UPF instance to apply the first metered amount includes configuring the first UPF instance to charge network traffic against the shared quota using a first rate, and
wherein configuring the second UPF instance to apply the second metered amount including configuring the second UPF instance to charge network traffic against the shared quota using a second rate.

19. The method of claim 15, wherein the shared quota is distributed between the first UPF instance and the second UPF instance based on predetermined quantities of network traffic to be permitted to be offloaded to each of the first network and the second network.

20. A system, comprising:
at least one processor;
memory in electronic communication with the at least one processor; and
instructions stored in the memory, the instructions being executable by the at least one processor to:
provision a data path that carries network traffic via a plurality of network flows to a plurality of networks, the data path including a plurality of offloading points having a first offloading point from which network traffic can be offloaded to a first network and a second offloading point from which network traffic can be offloaded to a second network, the second offloading point being chained in series behind the first offloading point such that the first offloading point is configured to make a determination to offload network traffic of a first network flow to the first network or pass the network traffic to the second offloading point and the second offloading point is configured to make a determination to offload network traffic of a second network flow to the second network;
receive a shared usage quota associated with a plurality of network flows including the first network flow and the second network flow;
configure the first offloading point to apply a first metered amount of the shared usage quota to the first network flow that is offloaded to the first network at the first offloading point; and configure the second offloading point to apply a second metered amount of the shared usage quota to the second network flow that is offloaded to the second network at the second offloading point.

* * * * *